(12) United States Patent
Danese et al.

(10) Patent No.: US 7,804,077 B2
(45) Date of Patent: Sep. 28, 2010

(54) PASSIVE ACTINIDE SELF-BURNER

(75) Inventors: Laurence Danese, Atlanta, GA (US); Alan Harvey Wells, Duluth, GA (US)

(73) Assignee: Neucon Technology, LLC, Atlanta, GA (US)

( * ) Notice: Subject to any disclaimer, the term of this patent is extended or adjusted under 35 U.S.C. 154(b) by 174 days.

(21) Appl. No.: 12/248,893

(22) Filed: Oct. 10, 2008

(65) Prior Publication Data

US 2009/0194712 A1    Aug. 6, 2009

Related U.S. Application Data

(60) Provisional application No. 60/998,504, filed on Oct. 11, 2007.

(51) Int. Cl.
*G21F 5/00* (2006.01)
(52) U.S. Cl. .................. 250/506.1; 204/274; 205/47; 210/661; 376/171; 376/172; 376/202; 376/311; 588/3; 75/399
(58) Field of Classification Search .............. None
See application file for complete search history.

(56) References Cited

U.S. PATENT DOCUMENTS

| | | | | |
|---|---|---|---|---|
| 3,843,765 A * | 10/1974 | Anderson et al. | ............... | 75/399 |
| 4,234,383 A * | 11/1980 | Anderson et al. | ............ | 376/311 |
| 4,297,304 A * | 10/1981 | Scheffler et al. | ................ | 588/3 |
| 4,666,490 A * | 5/1987 | Drake | ......................... | 588/256 |
| 4,814,046 A * | 3/1989 | Johnson et al. | ................ | 205/47 |
| 5,015,863 A * | 5/1991 | Takeshima et al. | ........ | 250/515.1 |
| 5,814,226 A * | 9/1998 | Tavlarides et al. | ........... | 210/661 |
| 5,940,461 A * | 8/1999 | Takeda et al. | ................ | 376/171 |
| 6,233,299 B1 * | 5/2001 | Wakabayashi | ............... | 376/202 |
| 6,355,857 B1 * | 3/2002 | Wagner | ........................ | 588/15 |
| 6,512,805 B1 * | 1/2003 | Takeda et al. | ................ | 376/171 |
| 6,734,334 B2 * | 5/2004 | Chekhmir et al. | .............. | 588/2 |
| 7,019,189 B1 * | 3/2006 | Chekhmir et al. | .............. | 588/12 |
| 7,449,131 B2 * | 11/2008 | Hayner et al. | ................ | 252/478 |
| 7,550,645 B2 * | 6/2009 | Chekhmir et al. | ............. | 588/11 |
| 2008/0128271 A1 * | 6/2008 | Lowery et al. | .............. | 204/274 |
| 2008/0232533 A1 * | 9/2008 | Blanovsky | .................. | 376/172 |

\* cited by examiner

*Primary Examiner*—David A Vanore
(74) *Attorney, Agent, or Firm*—Rodgers & Rodgers (57) ABSTRACT

The invention relates to the confinement of an alloy formed of actinide transuranic radioactive wastes and beryllium metal within a neutron moderating and reflecting apparatus to cause accelerated destruction (burning) of the actinide wastes. Waste actinides, including plutonium, neptunium, americium, and curium, emit alpha particles by radioactive decay. The alpha particles are converted into neutrons by the beryllium through an alpha-neutron (alpha, n) reaction. The neutrons developed by the alpha, n reaction are moderated by a surrounding layer of graphite, which allows the slowed neutrons to cause additional fission or decay events within the waste actinide alloy. This process is passive because the alpha particles that initiate the actinide burning are an intrinsic physical property of the actinides. The burning or decay process is accelerated because neutrons that would ordinarily escape the confinement fixture (a Standard Source capsule) are reflected back into the actinide waste, transmuting them into heavier, less stable isotopes that decay more rapidly. The use of the moderator/reflector material allows the waste actinides to be destroyed in a 10,000-year repository period instead of requiring one million years to attain the same waste reduction by natural radioactive decay alone. Beryllium may also be used as a neutron moderator/reflector, but is not a cost effective choice for large scale use.

16 Claims, 6 Drawing Sheets

Typical:  D = 0.50 inches
L = 1.75 inches

PASSIVE ACTINIDE SELF-BURNER

CROSS REFERENCE TO RELATED APPLICATION

This is a non-provisional application claiming benefit of U.S. Provisional Application Ser. No. 60/998,504 filed Oct. 11, 2007, and entitled Passive Actinide Self-burner, incorporated herein by reference.

FIELD

Embodiments of the invention relate to the field of nuclear waste (radioactive waste materials) disposal and methods. More particularly, embodiments of the invention relate to the disposal and accelerated destruction of transuranic actinide materials that are the residual products of the chemical dissolution of spent nuclear fuel and other components containing fissile materials.

BACKGROUND

Actinide and/or transuranic material destruction occurs naturally along well-understood decay chains to eventually become a stable non-radioactive element, lead. However, in natural decay, some of these elements remain dangerous to man over hundreds of thousands or millions of years.

Actinides are separated from spent nuclear fuel, and other components containing fissile materials, by chemical means. Fission and actinide products are left over from the splitting of atoms to make power and are the principal residual material in spent nuclear fuel. The fission products are short-lived by comparison to the actinide products, and are destroyed by the natural radioactive decay process in about one thousand years. Most actinide products, on the other hand, remain dangerous for many centuries. It is this extremely long decay process that results in target isolation objectives of the US Department of Energy (DOE) of 1,000,000 years.

In destruction by the natural decay process, the radioactive elements arrive at a stable state by the spontaneous emission of radioactive particles, including alpha particles and neutrons. By increasing the rate at which actinides decay to a stable state, the technological challenge and cost burden of establishing long-lived containment systems for the disposal of spent fuel may be significantly reduced.

The potential benefits of effectively reducing the half life of actinide elements has resulted in extensive experimental and operational programs having the sole objective of hastening the transmutation and decay of these products to a stable, and inherently safe, state.

Most applications directed to the destruction of actinides by transmutation or fission rely upon high neutron flux rates, similar to those found in operating reactors. To that end, many applications propose the inclusion of waste actinides in some portion of an active fuel assembly so that the material is transmuted or destroyed using the high neutron flux of the operating reactor.

While these methods do accelerate transmutation of the actinides to more stable forms thereby reducing the actinide waste quantity requiring disposal, they have the disadvantage of requiring special packaging, high-energy neutron sources and handling of the waste forms, which increases personnel radiation exposure and the risk of accident. The nuclear reactor or particle accelerator operations required by these methods are both complex and expensive.

This invention operates by converting the abundant alpha particles emitted by the actinides into neutrons via an alpha—neutron (alpha, n) reaction that is a property of Beryllium and some other elements such as oxygen. This raises the neutron flux of the container to about one ten thousandth of the level present in a nuclear reactor intended to burn the actinides in one or two years. The invention makes use of its passive nature and the 10,000-year minimum period required by regulations to accomplish the same level of destruction of the actinide waste after emplacement in a geological repository. By utilizing the invention, a million year waste isolation period is no longer required, and the shorter 10,000-year waste isolation period is much less complex to analyze and regulate.

As described herein, the preferred embodiment of the invention is intended for use with the current series of DOE Standard Canisters (herein after "Canisters" or "Canister") designed for geologic disposal.

SUMMARY

An apparatus that provides for the passive destruction of the actinides meets the waste actinide destruction and disposal needs described above. The invention relies upon the neutrons generated within the waste actinides to achieve accelerated destruction, by reflecting those neutrons back into the actinides for efficiency. No neutrons external to the system are introduced into the apparatus. The invention builds upon the current seal source technology that uses the same principles to generate neutrons for industrial testing and well logging purposes, but significantly extends that art to meet a need for accelerating the decay of very long-lived waste actinide isotopes.

The invention provides for the confinement of actinide or transuranic radioactive wastes, alloyed with beryllium, inside a graphite disk to cause accelerated destruction (burning) of actinide wastes. Actinides, including plutonium, neptunium, americium, and curium, emit alpha particles by radioactive decay. The alpha particles are converted into neutrons by the beryllium through an alpha-neutron (also called an alpha, n) reaction. The neutrons created in this reaction are absorbed by the actinides causing them to transmute to a heavier actinide isotope with a shorter half-life. An outer layer of graphite is provided to moderate and reflect neutrons back into the actinide zone to improve the efficiency of actinide burning. The outer layer could consist of beryllium metal as the neutron moderator and reflector, but its use results in a prohibitively expensive configuration.

The process is passive because the alpha particles that initiate the actinide destruction by radioactive decay are an intrinsic physical property of the actinides. The decay process is accelerated because neutrons that would escape the confinement system are reflected back into the actinide waste where they are captured, reducing the stability of those wastes. The use of a neutron moderator and reflector such as beryllium or graphite to initiate self-burning of actinides allows the quantity of actinides to be reduced much more rapidly than if decay where to occur naturally in accordance with the half-life of the material. Using this method, the actinides can be destroyed in the repository design period of 10,000-year instead of requiring 100,000 years to one million years to attain the same waste reduction by natural radioactive decay alone.

The waste actinides may be either individual actinide elements, or a mixture of actinides, which may also be mixed with beryllium metal, in any convenient solid metal, glass, resin, powder or other stable form. The waste actinide product, in addition to the beryllium, may contain binders or other compounds consistent with the stabilization method used. In the preferred embodiment, the waste actinide and beryllium are melted together to obtain a substantially mixed alloy. Intimate mixing of the waste actinides and beryllium improves alpha,n conversion efficiency.

The ideal configuration for the waste actinide/beryllium mixture or alloy is a sphere, which would be encased by a spherical shell of beryllium. This configuration presents the best volume to surface ratio for heat rejection. However, it also has the highest cost and is not considered suitable for routine use. The preferred embodiment for the waste actinide/beryllium alloy is as a cylinder sized for use with existing Standard Source capsules. This configuration is consistent with current methods of solidifying or stabilizing actinides, and with current storage and disposal package construction and fabrication practice. More importantly, it is consistent with the configuration of DOE Standard Sources capsules that are manufactured using actinides such as americium and curium, which have been separated from recycled spent nuclear fuel and refined. These sources, which emit neutrons by design, are widely used in industry.

Each DOE Standard Source is a cylindrical double-sealed capsule, 0.75 inches in diameter and 2.00 inches in length. The source configuration consists of an inner capsule with domed ends, an outer capsule with domed ends, and the metallic actinide source inside the inner capsule. Double encapsulation is provided to prevent the leakage of radioactive material from the source capsule. The capsules are fabricated from stainless steel.

The typical Standard Source contains 3.0 Curies of americium/beryllium in a metallic alloy form with an atomic ratio of beryllium to americium of 13:1. In the preferred embodiment described for this invention, the atomic ratio remains the same, but the actinide is comprised of unrefined actinides consisting primarily of americium, neptunium and curium, but also including a number of related isotopes, and is referred to herein as "waste actinide."

The waste actinides in the source produce alpha particles, many of which are converted to neutrons by collision with the beryllium atoms. The neutrons, in turn, are captured by the isotopes of the waste actinide, destroying a portion of the waste actinide and transmuting a larger portion to heavier isotopes. These heavier isotopes are much less stable than the original isotopes and decay more rapidly than the original isotopes. Thus the quantity of waste actinide remaining at any given future time, is less than if the Am and Cm were disposed of in another form to undergo natural decay.

In the preferred embodiment as described herein, individual sealed capsules are placed in wells drilled into a graphite disk. The graphite acts as a moderator for the neutrons created in the alpha, n reaction, allowing the slowed (or thermalized) neutron to transmute other actinide isotopes. Graphite is a cost-effective substitute for beryllium.

To provide for structural integrity and facilitate heat rejection, the exposed graphite surface, including the surface of the wells, is faced with stainless steel or aluminum. Once sealed capsules are inserted in the wells of the graphite disk, a closure plate of the same material, acting as a cover, is welded in place over the capsules. Based on the planned use of the Canister, the graphite would have the external shape of a disk, between 18 and 24 inches in diameter, and approximately 3 inches thick. One or more loaded and sealed graphite disks could be stacked within the Canister.

The number of capsules installed in each disk, and the number of disks placed in each Canister, is limited primarily by the heat of radioactive decay associated with each capsule. Such limit is determined by appropriate analysis to ensure that heat rejection limits of the repository package are not exceeded. In the preferred embodiment, the number of capsules in the 18-inch diameter graphite disk is 21.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
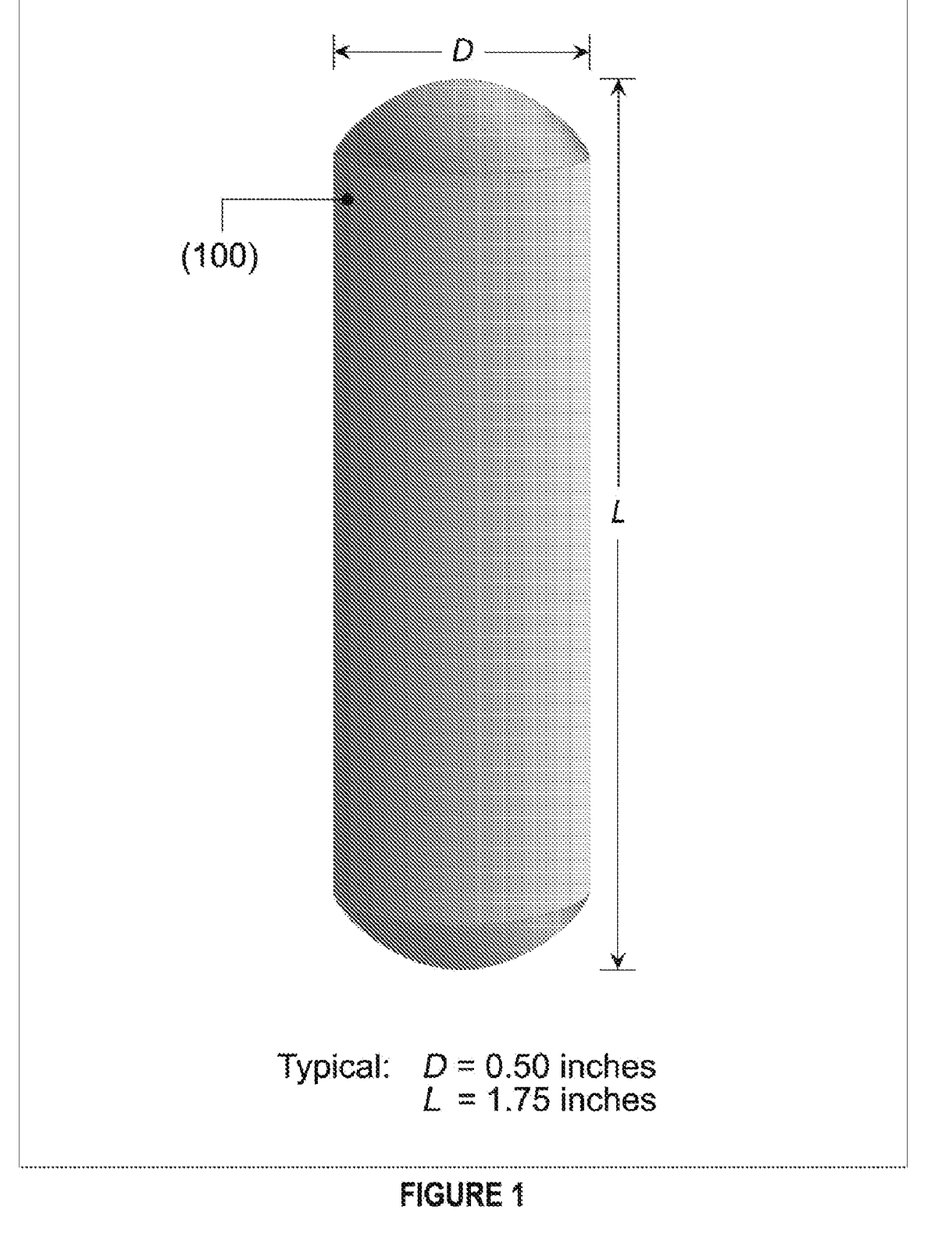
FIG. 1 depicts the cylindrical shape of the waste actinide/beryllium mixture.

FIG. 1 depicts the cylindrical shape of the waste actinide/beryllium mixture (100). In the preferred embodiment, the mixture is an alloy of waste actinide(s) and beryllium.

The passive operation of the actinide self-burner relies upon the close proximity of the waste actinide material to beryllium metal. Close proximity is necessary because of the short mean free path of the alpha particles within the mixture, since in the most effective operation, the alpha particle must encounter a beryllium atom in order to generate the neutron that will hasten actinide destruction.

Consequently, the actinide, or combination of actinides, and beryllium are substantially mixed. Once mixed, the material may be handled as a dry stable powder or alloy.

The cylindrical volume of the mixture is approximately 0.5 inches in diameter (D) and 1.75 inches in length (L). The radioactive contents would be approximately 3 curies of waste actinide material.

Figure 2:
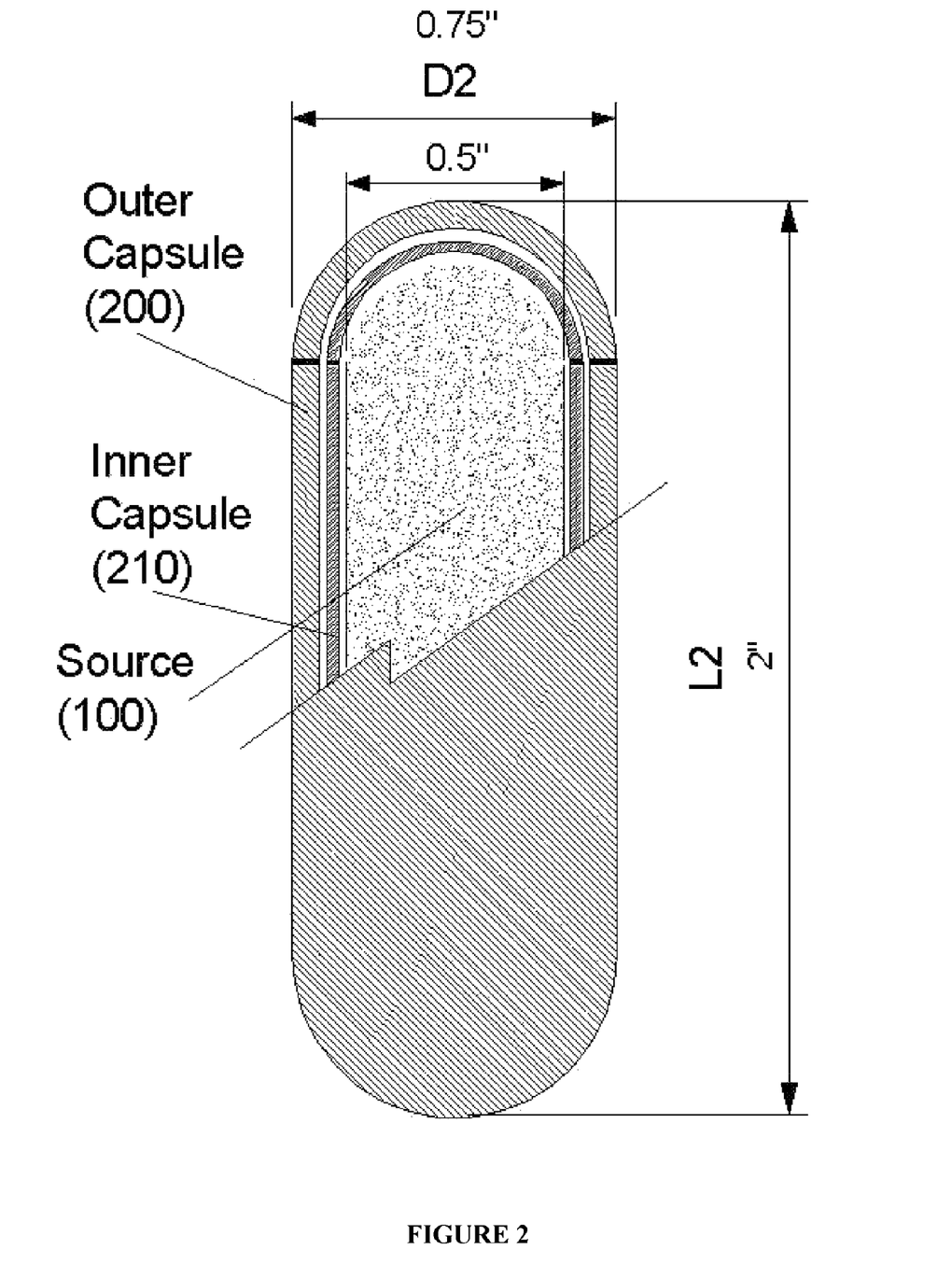
FIG. 2 depicts the cylindrical capsule that would hold the waste actinide/beryllium mixture or alloy.

FIG. 2 depicts the cylindrical capsule that contains the waste actinide/beryllium alloy.

In the preferred embodiment, each first (outer) capsule (200) is a cylindrical stainless steel vessel, being 0.75 inches in external diameter (D2) and 2.00 inches in external length (L2). Within this first capsule is a second (inner) capsule (210) with the necessary reduced external dimensions. Each capsule has domed upper ends such that the domed ends can be welded to the cylindrical body of the capsule. Double encapsulation is provided to prevent the leakage of radioactive material from the source capsule. The capsules are fabricated from stainless steel and are individually welded shut by a suitable process and may be leaked tested to verify closure.

It is intended that DOE Standard Source capsules, or Standard capsules, be used for the purpose of confining the waste actinide/beryllium material. This allows the capsules to be prepared, filled, sealed and handled in accordance with DOE procedures. Further, the capsules are procured in accordance with the applicable DOE specifications. However, use of the Standard Source capsule is not required to achieve the desired results.

Use of the Standard capsules takes advantage of the familiarity of that design to those operators who normally load, handle and maintain these devices. It further ensures the material, welding, testing and handling controls required by the applicable standards for fabrication and use.

Figure 3:
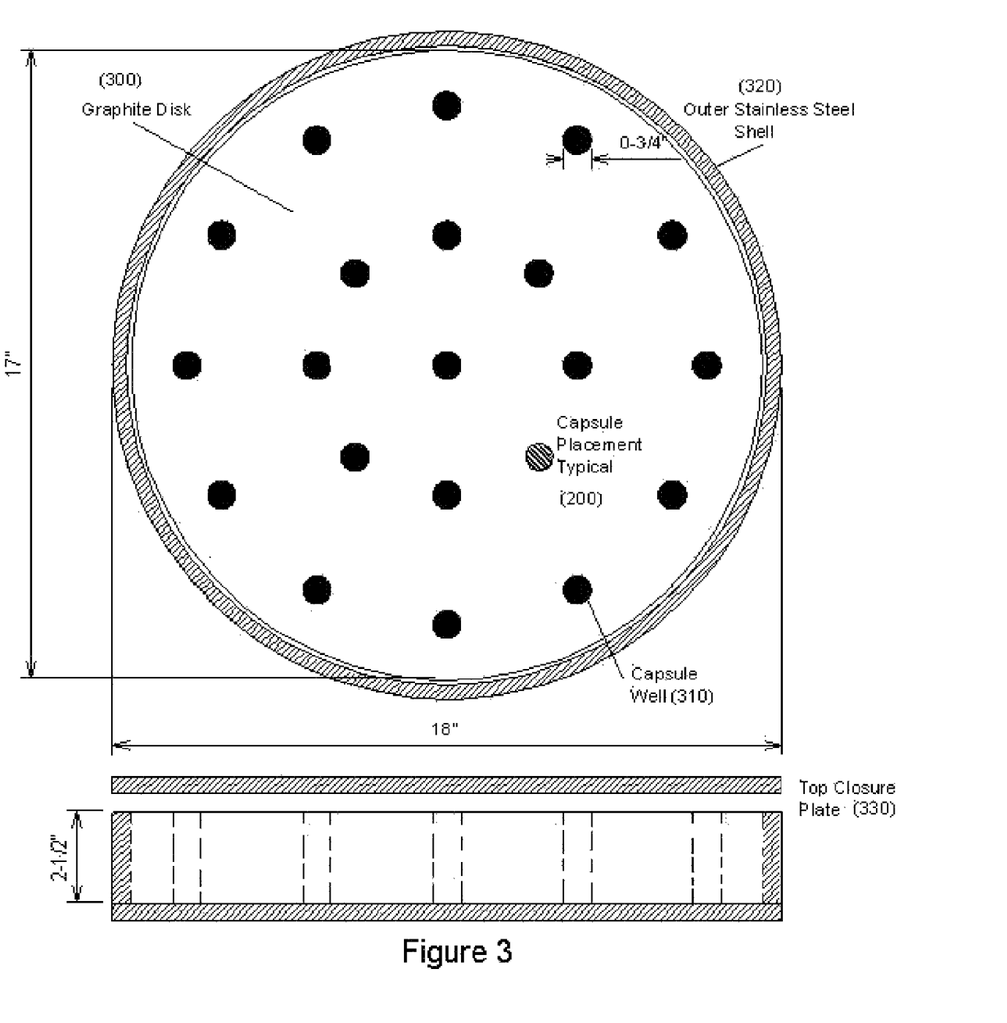
FIG. 3 depicts a graphite disk and illustrates typical placement of a capsule within it.

In the embodiment shown in FIG. 3, structure 300 depicts a graphite disk and illustrates typical placement of a capsule (200) within it. Note that when welded closed, Item 200 contains within it the second sealed capsule (210) and the actinide/beryllium material (100).

Structure 300 consists of a 2.5-inch-thick cylindrical graphite reflector disk into which the capsules are inserted. The cylindrical graphite reflector is 17 inches in diameter for the 18" Canister or 22.75 inches in diameter for the 24" Canister. The graphite disk is perforated by a number of cylindrical holes or wells 310 (typical) to allow the insertion of the capsules. The disk bottom surface and side is covered with 1/8-inch thick 316 L stainless steel or aluminum (320). Each well is lined with a 3/16-inch thick 316 L stainless steel tube. Once all of the capsule positions are loaded, the graphite disk top surface is closed with a welded cover (330) of the same thickness. The stainless steel or aluminum provides structural support and heat conduction for the capsules.

The purpose of the graphite reflector is to slow down the fast neutrons created by the alpha particle collisions with beryllium so that the neutrons can transmute the actinide isotopes. Crumpled aluminum foil or other similar filler material may also inserted into the top and bottom of the cylindrical well that holds each capsule to provide axial support for the capsule and to aid in heat transfer to the stainless steel or aluminum cover of the graphite reflector assembly. The graphite reflector assembly, loaded with source capsules, is seal welded close to provide a third barrier against the release of radioactive material during handling operations.

The heat conduction disks are used as separators for the graphite reflector assemblies when the graphite assemblies are stacked within a Canister. The heat conduction disks are fabricated from copper or aluminum and have the same outside diameter as the graphite reflector assembly. The thickness is nominally 1/4 inch for copper and 3/16 inches for aluminum. The disks provide a conduction path to the Canister cavity surface for decay heat generated in the capsules.

The sealed reflector disks (300), loaded with source capsules (200), may be stacked into a 10-foot or 15-foot long Canister. Each loaded reflector disk assembly is separated from the one below it by a copper or aluminum heat conduction disk. Extra space at the end of the Canister may be filled, e.g. by aluminum foil, to prevent axial motion of the loaded reflector disks. While a Canister is assumed for geologic disposal of such waste, there is no requirement to use the Canister. Any container qualified for long-term storage or testing could be used.

The preferred embodiment assumes that the actinide waste material is packaged for geologic disposal. Consequently, the graphite disk(s) are sized to fit the Canister, the DOE disposal package. However, any size graphite disk may be used, including a disk that is designed to hold a single capsule. Such configurations may be required for long-term storage that anticipates future disposal, or for testing.

Figure 4:
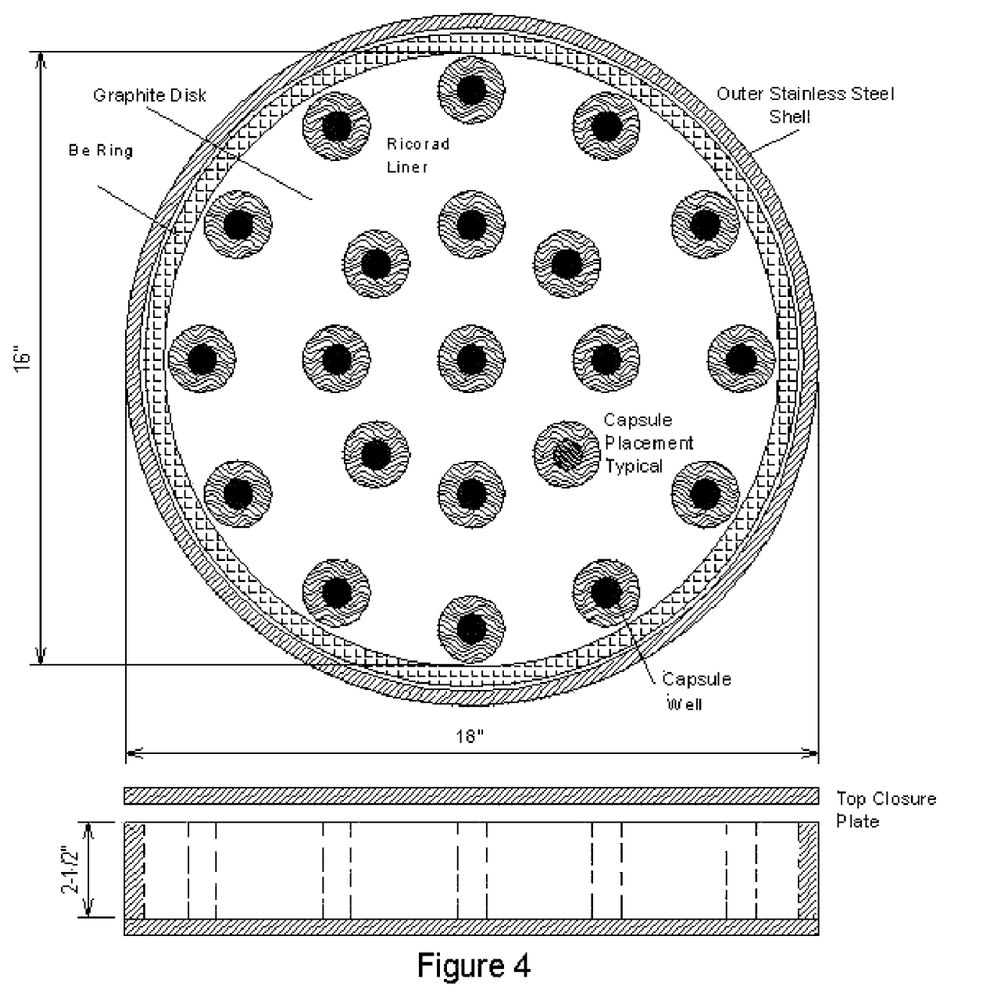
FIG. 4 depicts an alternate graphite disk embodiment incorporating an outer ring of beryllium and a Ricorad™ material lining at each well.

FIG. 4 depicts an alternate graphite disk embodiment in which an outer most 1-inch ring of graphite is replaced by a ring of beryllium and the individual capsule wells are lined with a one half-inch ring of Ricorad™ material. In all other respects, this embodiment is the same as that depicted in FIG. 3. The inclusion of the outer ring of beryllium significantly improves the effectiveness of the apparatus of FIG. 3 by increasing the number of neutrons that are reflected, while the Ricorad™ liner material improves neutron thermalization. These effects combine to cause additional decay events within the waste actinide material. While the beryllium ring and Ricorad™ improve neutron production by a factor of approximately 2.2, the inclusion of these materials significantly increase the cost of this embodiment.

Figure 5:
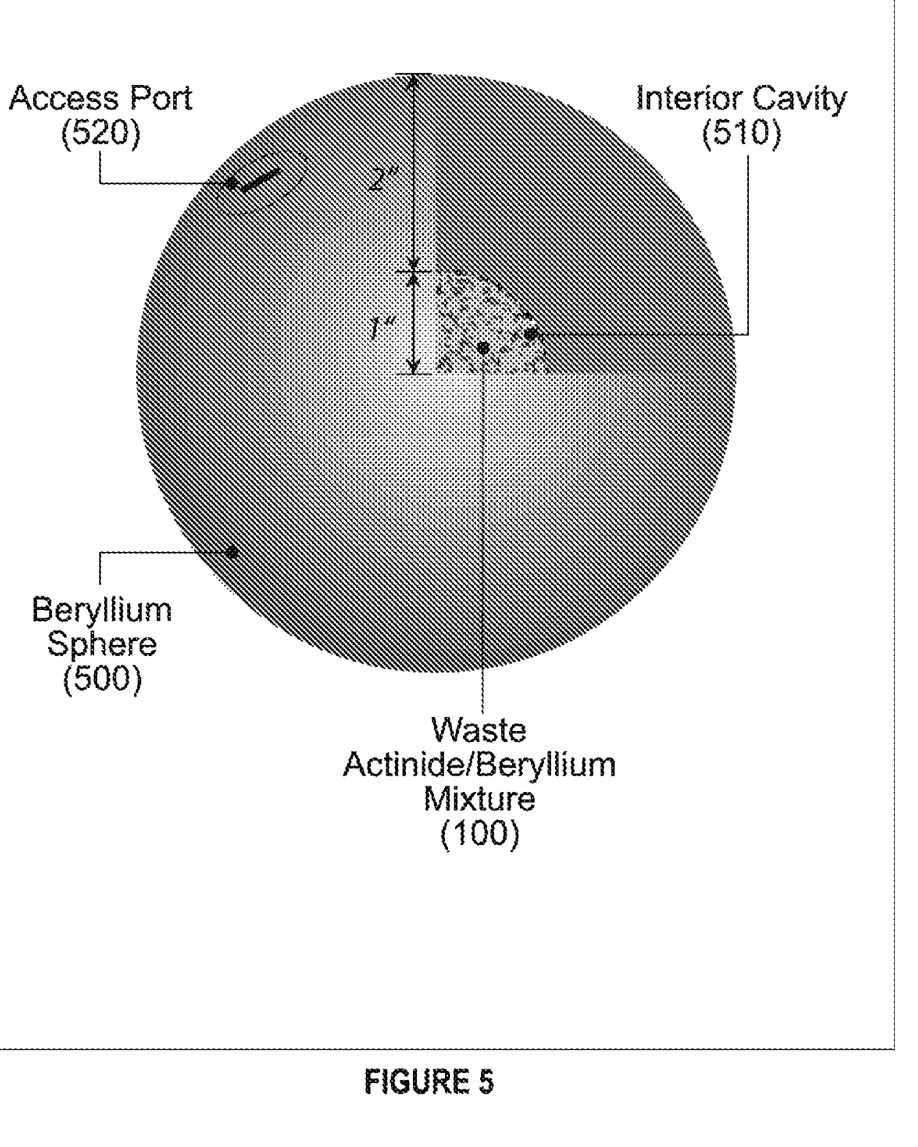
FIG. 5 depicts an alternate spherical embodiment of the invention.

FIG. 5 depicts an alternate spherical embodiment of the invention. This embodiment consists of a beryllium sphere (500) approximately 6.0 inches in diameter, having an interior cavity (510) approximately 2 inches in diameter. In this embodiment, the interior cavity is filled with a waste actinide/beryllium substantially mixed powder (100). The fill hole is then closed and sealed. In this embodiment, the beryllium sphere acts in the same manner as the graphite disk previously described. The sphere both moderates the fast neutrons developed by the alpha-n reaction and reflects those slowed neutrons back into the waste actinides, thereby accelerating the destruction of the waste actinides.

While this alternate embodiment accomplishes the same objective as the preferred embodiment, the cost of the beryllium shell makes its use unattractive for other than experimental purposes.

Figure 6:
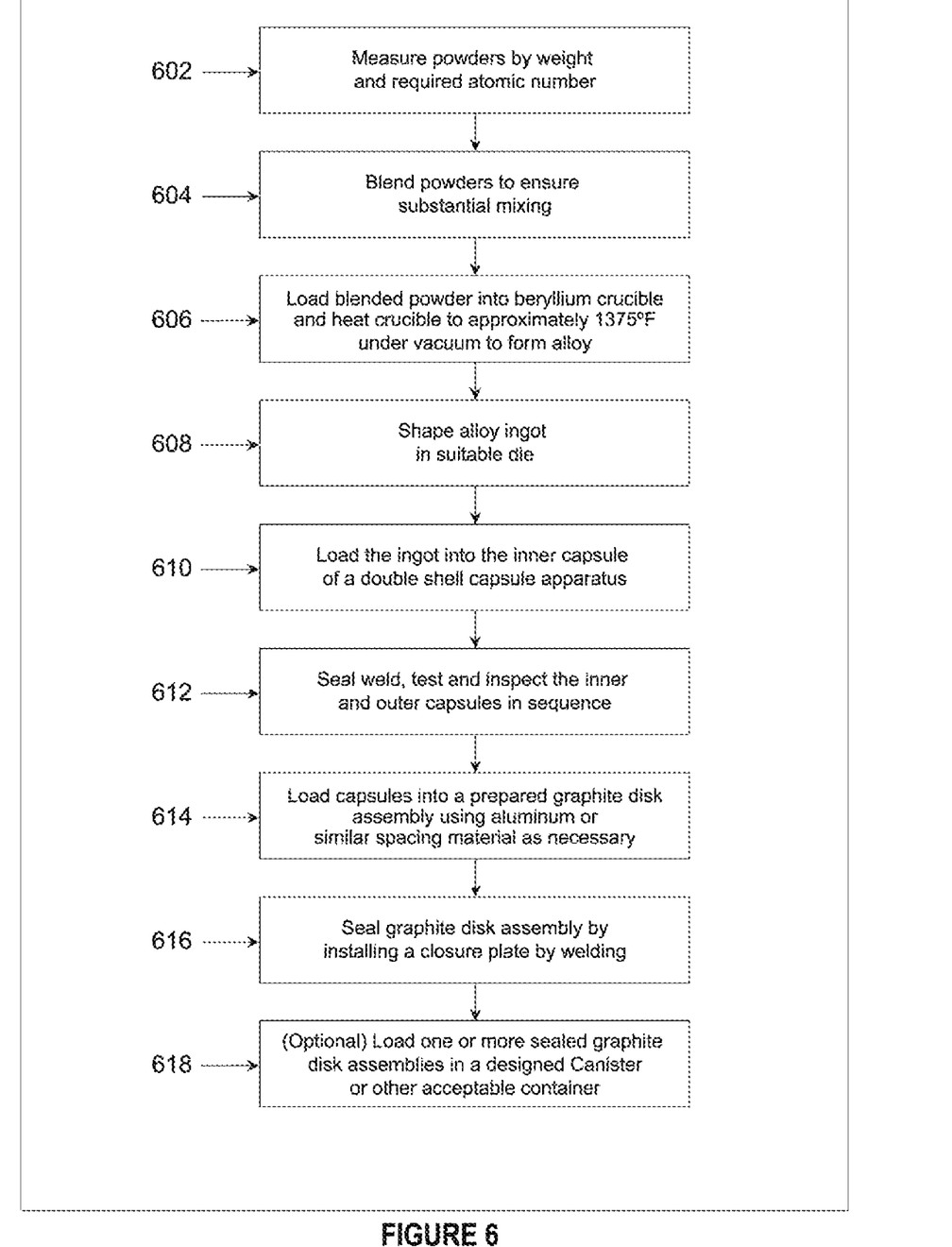
FIG. 6 depicts a flowchart of the typical steps of a method of making a sealed capsule and closing the graphite disk.

An embodiment shown by the diagram in FIG. 6 depicts a flowchart of the typical steps of a method of making a sealed capsule and closing the graphite disk.

The preferred embodiment includes the steps of measuring 602 by volume and material curie content, a first amount of a waste actinide powder, and a second amount of a beryllium metal powder material; blending 604 the powders to form a uniform first mixture; loading 606 the first mixture into a suitable beryllium crucible and heating the crucible and its first mixture contents to 1375° F. in a vacuum chamber to form a first alloy material; shaping 608 the alloy material in a suitable die; loading 610 the alloy ingot into an inner capsule; sealing, inspecting and testing 612 the inner and an outer capsules; loading 614 the sealed capsules into a prepared graphite disk; sealing 616 the graphite disk by welding a top cover plate; and, loading 618 one or more sealed graphite disks into a Canister for disposal or other container.

The measuring step 602 considers that the interior space of the Standard Source capsule volumetrically limits the quantity of the first mixture, but the quantity may also be limited by the curie content of the actinide material. The curie content determines the heat output of each capsule, which must be considered in the managing the total heat load within the Canister. The actinide powder may be comprised of unrefined individual actinide isotopes; or, a mixture of such waste actinides consisting primarily of americium, neptunium and curium, but also including a number of related isotopes. In addition, the quantities of the powders are controlled to achieve a preferred 1:13 atomic ratio of waste actinide to beryllium. The atomic ratio achieved is determined by weighing powders, which may result in some minor deviations from the target ratio. In addition, other ratios can be used, such as 1:167.

The blending step 604 is important since the efficiency of the alpha, n reaction requires that the waste actinide material and the beryllium be in close proximity within the mixture. Consequently, substantial mixing of the two powders is required.

The process step 606 forms the waste actinide/beryllium alloy by loading the mixed powders into a beryllium oxide crucible. The crucible is heated to 1375° F. in a vacuum oven until the mixture is a molten alloy. A vacuum is applied to draw off any fluorine gases, $F_2$, which might be present from the chemical processing of the waste actinide(s). The actual temperature applied is somewhat less important than achieving the molten state necessary to form the alloy. However, a temperature of 1375° F. is typically used, and is considered to be an acceptable target value for this purpose.

The alloy is cooled in a suitable die 608 to establish the form of the ingot that allows it to be inserted in the inner capsule. The cooled ingot is inspected and polished if necessary.

The alloy ingot is inserted 610 into the inner capsule. As previously described, the capsule assembly consists of an inner and outer capsule, which conforms to the design and specifications of the DOE Standard Source capsule. This capsule assembly, and arrangement, are identical to those already supplied to industry as neutron sources, and there are no unique procurement, process or handling steps associated with the use of the Standard Source capsule. While use of the Standard Source capsule is anticipated, its use is not required.

Close 612 the inner and outer capsules welding, and inspect and test the completed capsule for leakage. The post seal welding inspection and test activities are preformed individually on the inner and outer capsules.

Once sealed, the capsules are loaded 614 into wells in the graphite disk assembly. Within each well, the individual capsules may be supported in the axial direction by crumpled aluminum, or other similar filler material, to provide axial support and to aid in the transfer of decay heat away from the capsule.

There are no unique processing activities associated with the graphite disk except to cut or trim the disk to the appropriate dimensions and then to enclose the disk with a stainless steel or aluminum covering to create a disk assembly. The covering lends structural integrity to the graphite disk, protects the graphite from handling damage, facilitates the transfer of decay heat to the walls of the Canister, and allows of the welding of a closure plate to the top of the disk.

A top cover is welded 616 to the disk assembly to seal the assembly and to retain the individual capsules in the wells that are incorporated into the disk to receive the capsules. The closure weld is inspected and tested to verify sealing.

One or more sealed graphite disk assemblies may be loaded 618 into a designed Canister or other container. Individual loaded disk assemblies may be separated by placing copper or aluminum disks between the disk assemblies to assist in transferring decay heat from the capsules to the interior walls of the Canister or container. The diameter of both the disk assembly and heat transfer disks must be determined based on the interior dimensions of the DOE waste disposal Canister or container intended for use. The number of loaded disk assemblies that may be placed inside a Canister in a stacked array may be limited by either the total decay heat load allowed by the Canister specifications or by the available stacking height within the Canister. Since this configuration is not a requirement of the embodiment, its representation is not provided. However, where stacking of graphite disks is used, separating cooper or aluminum disks to improve decay heat transfer should also be use.

The description provided is a preferred embodiment that utilizes a known process and configuration for encapsulating the waste actinide/beryllium alloy. While there are significant benefits in using this encapsulating method, the success of the technique described herein is not dependent upon the use of that encapsulating method. Consequently, in other embodiments, the diameter and length of the alloy ingot and its method of confinement (i.e., such as alloy ingots stacked in a long tube closed at each end) may altered to conform to the intended handling, long-term storage or disposal requirements of given container.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for the confinement of long-life waste actinide and beryllium mixture in a capsule placed within a neutron moderator material to accelerate the destruction or transmutation of the waste actinide to the stable nonradioactive states of the waste actinide decay series, and said capsule being a double shell, stainless steel vessel containing the waste actinide having a length of about 2.0 inches and a diameter of about 0.75 inches.

2. A method according to claim 1 wherein the waste actinide contents of the capsule may be a single isotope or a mixture of isotopes in a stable dry state, including isotopes mixtures stabilized by glass, resin, ceramic or polymer binders, mixed with beryllium in the appropriate atomic ratios.

3. A method according to claim 2 wherein the waste actinide and beryllium mixture is an alloy.

4. A method according to claim 2 wherein the waste actinide and beryllium mixture is formed as a block or sphere encased in a shell of beryllium.

5. A method according to claim 3 wherein a graphite disk is substantially encased in stainless steel or aluminum, having one or more wells to accept loaded capsules.

6. A method according to claim 3 wherein a graphite component may be a graphite block of regular or irregular shape.

7. A method according to claim 1 wherein one or more capsules containing the waste actinide/beryllium contents are placed within a graphite disk.

8. A method according to claim 7 wherein the graphite disk is sized to fit various DOE Standard Canisters for disposal, or other accepted long-term storage radioactive waste containers.

9. A method according to claim 8 wherein the stainless steel or aluminum encased the graphite is loaded with capsules closed by a welded cover.

10. A method according to claim 9 wherein the graphite disks may be stacked within a Canister or other acceptable container.

11. A method according to claim 9 wherein stacked graphite disks are separated by copper or aluminum disks of the same diameter to aid in heat transfer within the Canister or other acceptable container.

12. A method according to claim 7 wherein crumpled aluminum or other similar impact absorbing material is provided in each capsule well of the graphite disk to provide for axial support and transfer of decay heat.

13. A method according to claim 1 wherein the capsule may be a single shell or double shell configuration having a length and diameter to conform to the design requirements of a specific testing, long-term storage or disposal container.

14. A method according to claim 13 wherein a graphite or beryllium reflector/moderator is of a specified length and diameter to conform to the design of the confined alloy.

15. A preferred method of making an apparatus for passively accelerating the rate of radioactive decay of waste actinides, the method including the steps of a. mixing a powder form of waste actinide and beryllium in an atomic weight ratio of 1:13 to form a uniform first mixture;

b. loading the mixture into a beryllium oxide crucible and subsequently heating the mixture to 1375° F., under vacuum, to achieve a molten alloy;

c. shaping the molten alloy in a suitable die forming an ingot;

d. loading the ingot into a double shell capsule and closing the inner and outer capsules by welding, inspecting and testing wells to verify sealing;

e. preparing a graphite disk to accept sealed capsules by encasing the bottom and sides of the graphite in stainless steel or aluminum, creating wells within the graphite, also lined with stainless steel or aluminum, to form a graphite assembly;

f. loading sealed capsules in the wells of the graphite assembly, using crumpled aluminum or similar material as necessary to provide axial support or to improve heat transfer from the capsules to the graphite disk housing; and g. closing the graphite assembly by installing and welding in place a top closure plate.

16. An apparatus comprising long-life waste actinide and beryllium mixture in a capsule placed within a neutron moderator, reflector material incorporated into said capsule, said mixture comprising alpha particle radiation emitted in natural decay which undergoes a subcritical nuclear reaction with adjacent beryllium thereby releasing a fast neutron which is subsequently slowed down or thermalized, and said neutron being retained within the apparatus by said reflector material such that it is available to cause transmutation of other waste actinides within the apparatus and thereby accelerate the destruction or transmutation of the waste actinide to the stable nonradioactive states of the waste actinide decay series.

* * * * *